United States Patent
Haikawa et al.

(10) Patent No.: US 6,880,806 B2
(45) Date of Patent: Apr. 19, 2005

(54) ACTUATOR FOR DRIVING ROTARY VALVE ACTUATOR AND VALVE DEVICE WITH THE ACTUATOR

(75) Inventors: Tomoyuki Haikawa, Tokyo (JP); Kouichi Sekine, Tokyo (JP)

(73) Assignee: Yamatake Corporation, Tokyo (JP)

( * ) Notice: Subject to any disclaimer, the term of this patent is extended or adjusted under 35 U.S.C. 154(b) by 85 days.

(21) Appl. No.: 10/470,254

(22) PCT Filed: Jan. 26, 2001

(86) PCT No.: PCT/JP01/00544
§ 371 (c)(1),
(2), (4) Date: Jul. 23, 2003

(87) PCT Pub. No.: WO02/059513
PCT Pub. Date: Aug. 1, 2002

(65) Prior Publication Data
US 2004/0099833 A1 May 27, 2004

(51) Int. Cl.[7] ............................................. F16K 31/00
(52) U.S. Cl. ...................... 251/292; 251/305; 137/556; 137/385
(58) Field of Search ................................ 251/292, 304; 137/556–56.3, 385

(56) References Cited

U.S. PATENT DOCUMENTS

| | | | | |
|---|---|---|---|---|
| 5,240,030 A | * | 8/1993 | Wang | 137/269 |
| 5,257,771 A | * | 11/1993 | Portis et al. | 251/293 |
| 5,564,461 A | * | 10/1996 | Raymond et al. | 137/315.35 |
| 5,597,260 A | | 1/1997 | Peterson | |
| 5,634,486 A | * | 6/1997 | Hatting et al. | 137/315.01 |
| 5,924,442 A | * | 7/1999 | Vorosmarti | 137/315.35 |
| 5,954,088 A | * | 9/1999 | Huang | 137/315.21 |
| 6,213,148 B1 | * | 4/2001 | Wadsworth et al. | 137/556 |
| 6,662,821 B2 | * | 12/2003 | Jacobsen et al. | 137/312 |
| 6,742,765 B2 | * | 6/2004 | Takano et al. | 251/292 |

FOREIGN PATENT DOCUMENTS

| | | |
|---|---|---|
| JP | 53-15955 | 4/1978 |
| JP | 60-220286 A | 11/1985 |
| JP | 3-33503 A | 2/1991 |
| JP | 6-1951 U | 1/1994 |
| JP | 7-332521 A | 12/1995 |
| JP | 3052091 U | 6/1998 |
| JP | 11-294420 A | 10/1999 |
| JP | 3026251 B2 | 1/2000 |
| JP | 2000-193129 A | 7/2000 |

* cited by examiner

Primary Examiner—J. Casimer Jacyna
(74) Attorney, Agent, or Firm—Frishauf, Holtz, Goodman & Chick, P.C.

(57) ABSTRACT

A valve gear includes a valve (30), which controls a flow rate of a fluid and an opening of which is determined according to a rotational position of a valve element, an actuator (20) for providing a rotational force to a rotary valve shaft that changes the opening of the valve (30), and attaching/detaching means. The attaching/detaching means includes a locking element (32) formed at its prescribed positions with locking concave/convex portions and an engaging element (22) formed at its prescribed positions with engaging concave/convex portions. The locking element (32) and the engaging element (22) are relatively rotatable around the rotary valve shaft up to a prescribed angle, and prevent the actuator (20) from coming off the valve (30) at an engaging position where the engaging concave/convex portions and the locking concave/convex portions are engaged with one another, and allow the actuator (20) and the valve (30) to be detached from each other at a disengaging position.

8 Claims, 10 Drawing Sheets

US 6,880,806 B2

ACTUATOR FOR DRIVING ROTARY VALVE ACTUATOR AND VALVE DEVICE WITH THE ACTUATOR

This application is a U.S. National Phase Application under 35 USC 371 of International Application PCT/JP01/00544 filed Jan. 26, 2001.

TECHNICAL FIELD

The present invention relates to a rotary valve actuator for actuating a valve, which is mounted on the valve and provides a rotational force to change the valve opening, and a valve gear comprising the same. More specifically, the present invention relates to a rotary valve actuator capable of being easily attached to/detached from a valve, and a valve gear comprising the same.

BACKGROUND ART

A rotary valve actuator for activating a rotary valve is known that is mounted on the valve and provides a rotational force that changes the valve opening.

A conventional rotary valve actuator is shown in FIG. 4 of Japanese Utility Model Kokai Publication No. Hei 6-1951, for instance. This actuator has an output shaft adapted to be coupled through a joint to an operation shaft of an opening/closing valve at chamfered portions of these shafts when the actuator is mounted on the valve. The actuator is securely mounted on the valve by tightening them by using a bolt and nut, with the bolt inserted through mounting bores formed individually in flange portions of the actuator and the valve.

Another conventional rotary valve actuator is disclosed in FIG. 1 of Japanese Patent Application Kokai Publication No. 2000-193129, for example.

This actuator is provided at an end portion of its output shaft with a fitting groove to which a split ring is fitted. On the other hand, a valve has a bracket formed with a shaft cylinder portion that permits the actuator's output shaft to pass therethrough. The bracket is also formed at its prescribed portion with an engaging groove to which the split ring is engaged. When engaged in the fitting and engaging grooves, the split ring serves to prevent the actuator from coming off the valve.

In order to detach the actuator from the valve for maintenance for example, the actuator is pulled to widen the diameter of the split ring, whereby the engagement between the fitting groove and the split ring is released, so that the output shaft of the actuator can be pulled out of the shaft cylinder of the bracket.

In case of the former rotary valve actuator, it is necessary to utilize a tool such as a screwdriver at the time of detachment of the actuator since the actuator is mounted on the valve by using a fastening tool comprising a bolt and nut. The detaching operation costs work, especially in case that the actuator and the valve are installed near an indoor ceiling, for example.

On the other hand, in the case of the latter rotary valve actuator, a tool such as a screwdriver is not required for the detachment of the actuator since the actuator is mounted on the valve merely by elastic force of the split ring. However, if the prescribed or greater axial external force is mistakenly applied to a housing of the actuator, the actuator comes off the valve. Also in another embodiment illustrated in FIGS. 4–9 of Japanese Patent Application Kokai No. 2000-193129, any tools are not required at the time of the attachment or detachment of the actuator, but a nut has to be rotated many times, so that the workability is poor.

DISCLOSURE OF THE INVENTION

The present invention has been made in light of the above circumstances, and an object thereof is to provide a rotary valve actuator which does not require a tool such as a screwdriver when being attached to or detached from a valve, does not mistakenly come off the valve due to an axial external force that acts upon a housing of the actuator, and is attachable/detachable without rotating a jointing nut many times, and a valve gear comprising the same.

In order to achieve the above-mentioned object, the valve gear including the rotary valve actuator according to the present invention comprises, as described in claim 1, a valve for controlling a flow rate of a fluid, an opening of the valve being determined according to a rotational position of a valve element; an actuator for providing a rotational force to a rotary valve shaft that changes the valve opening, and attaching/detaching means for detachably attaching the actuator and the valve. The attaching/detaching means comprises a locking element formed at its prescribed positions with locking concave/convex portions and an engaging element formed at its prescribed positions with engaging concave/convex portions. The locking element and the engaging element are relatively rotatable around a rotary valve shaft up to a prescribed angle. The engaging element and the locking element prevent the actuator from coming off the valve at an engaging position where the engaging concave/convex portions and the locking concave/convex portions are engaged with one another, and allow the actuator and the valve to be detached from each other at a disengaging position where the engagement between the engaging concave/convex portions and the locking concave/convex portions is released.

The attachment/detachment of the actuator to/from the valve does not require a tool such as a screwdriver, and attaching/detaching operation can be easily performed since the locking and engaging elements are relatively rotatable around the rotary valve shaft up to the prescribed angle, prevent the actuator from coming off the valve at the engaging position where the engaging concave/convex portions and the locking concave/convex portions are engaged with one another, and allow the actuator and the valve to be detached from each other at the disengaging position where the engagement between the engaging concave/convex portions and the locking concave/convex portions is released. Moreover, the actuator does not mistakenly come off the valve due to the axial external force that acts upon a housing of the actuator, thereby offering high security. Furthermore, since the actuator can be attached to or detached from the valve without rotating the jointing nut many times, workability in the attachment/detachment is excellent.

Preferably, as described in claim 5, the attaching/detaching means of the valve gear has a holding portion for holding the engaging element rotatably around the rotary valve shaft up to the prescribed angle. The holding portion is designed to be fixed to the actuator, whereas the locking element is designed to be fixed to the valve.

Since the holding portion and the engaging element that is held by the holding portion so as to be rotatable up to the prescribed angle are designed to be mounted on the actuator side, the valve gear requires that only the locking element is mounted on the valve side thereof. This makes it possible to utilize valves of various sizes and kinds for the valve gear according to the present invention.

BEST MODE OF CARRYING OUT THE INVENTION

Hereinafter, a valve gear comprising a rotary valve actuator for activating a rotary valve, according to a first embodiment of the present invention, will be explained with reference to drawings.

Figure 1:
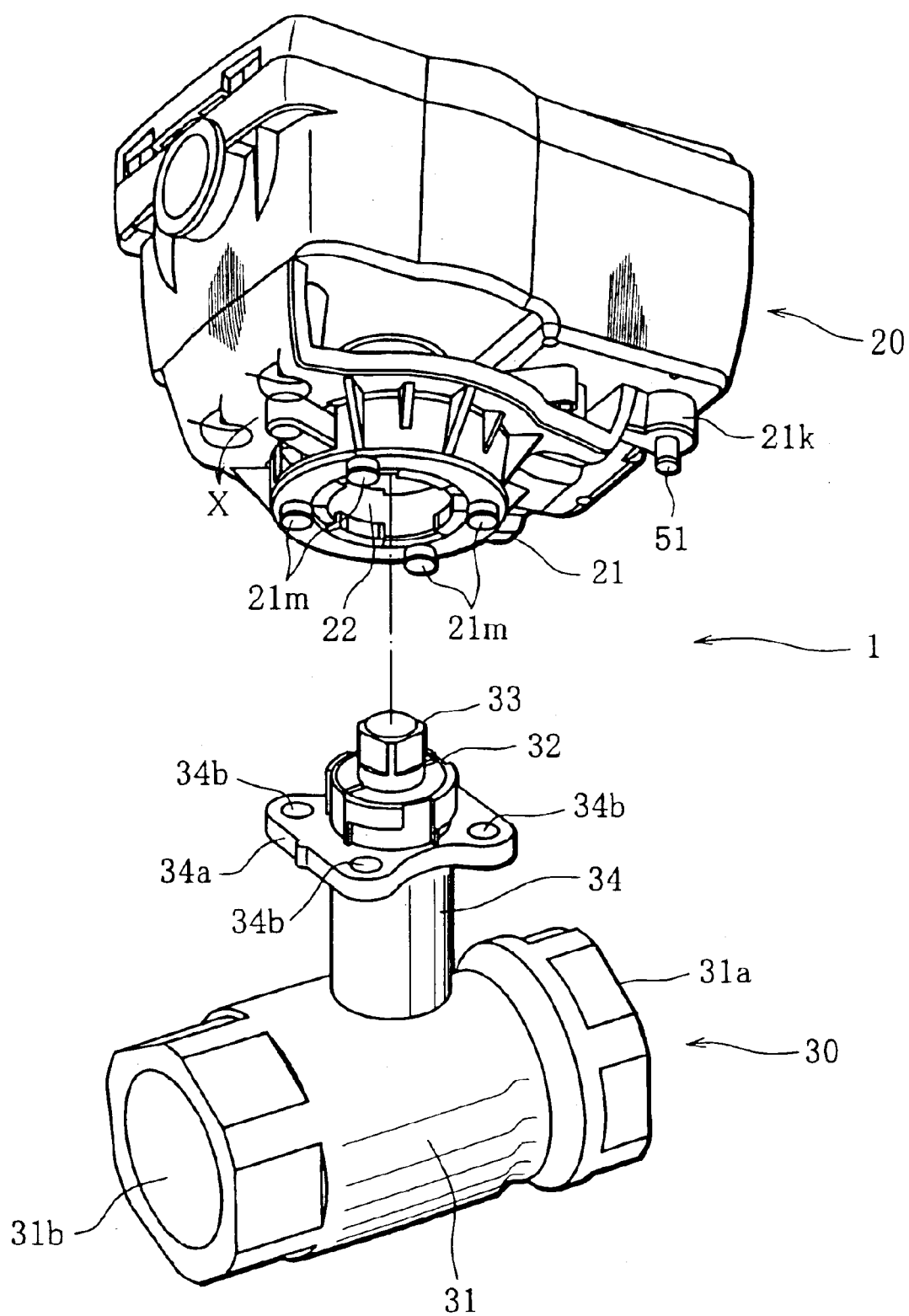
FIG. 1 is a perspective view of a valve gear according to a first embodiment of the present invention, with an actuator diagonally seen from below and a valve diagonally seen from above.

A valve gear 1 including the rotary valve actuator (hereinafter simply referred to as "actuator") according to the first embodiment of the present invention comprises, as illustrated in FIG. 1, an actuator 20 having, on the output shaft side thereof, a resin-made yoke (holding member) 21 and a resin-made engaging element (rotating member) 22; and a ball valve 30 having a resin-made locking element 32 that is fixed on the operation shaft side and adapted to be engaged with the engaging element 22 of the actuator 20.

Figure 2:
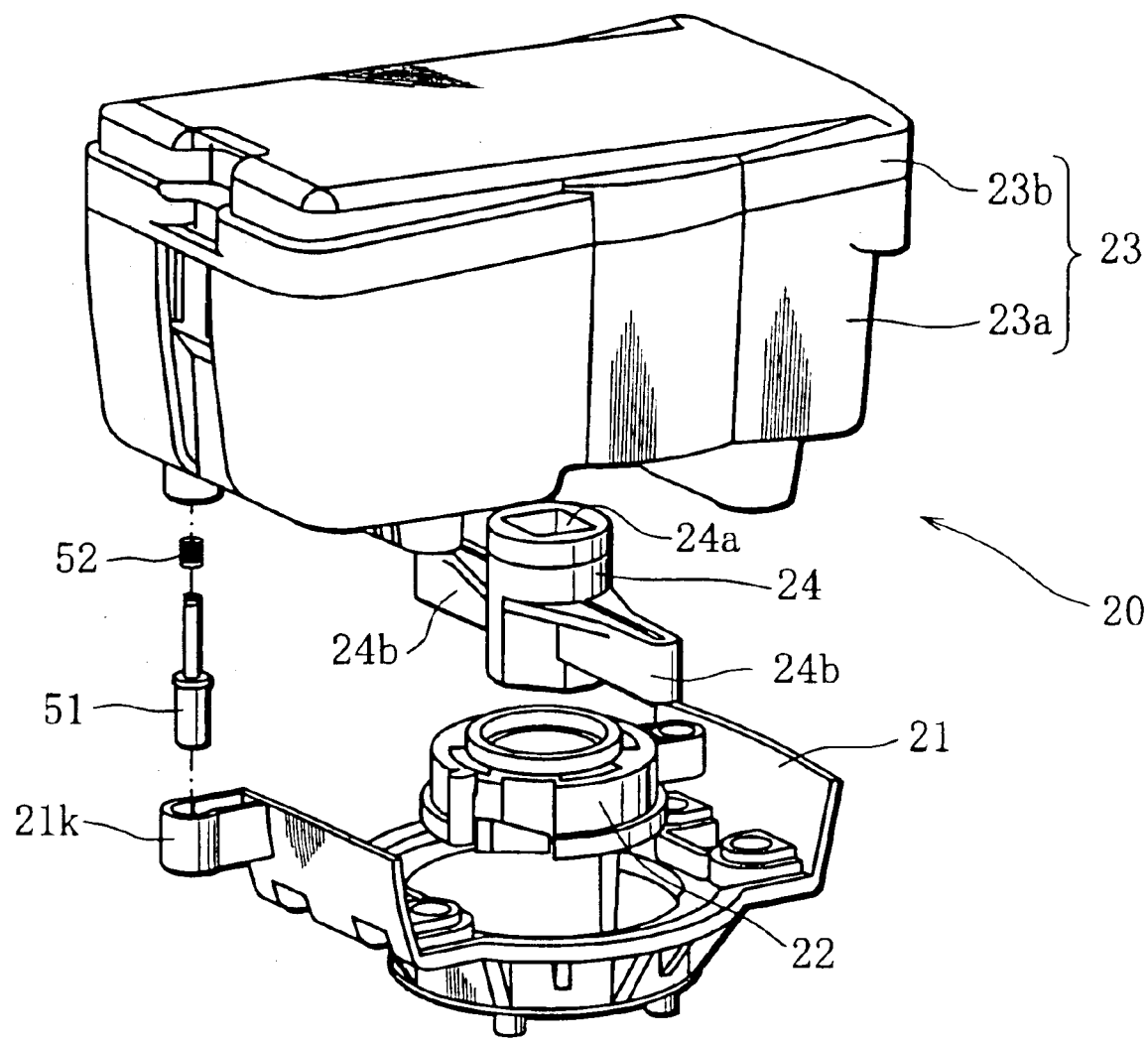
FIG. 2 is a perspective view of the actuator shown in FIG. 1 that is partially decomposed.

As shown in FIG. 2, the actuator 20 comprises a housing 23 including a case 23a and a cover 23b, the yoke 21 mounted on a bottom surface of the housing 23 to couple the housing 23 onto the ball valve 30, the engaging element 22 housed in the yoke so as to be rotatable within a prescribed range, and a joint 24 for torque transmission, which joint concentrically couples the output shaft of the actuator 20 and the operation shaft of the ball valve 30.

Figure 3:
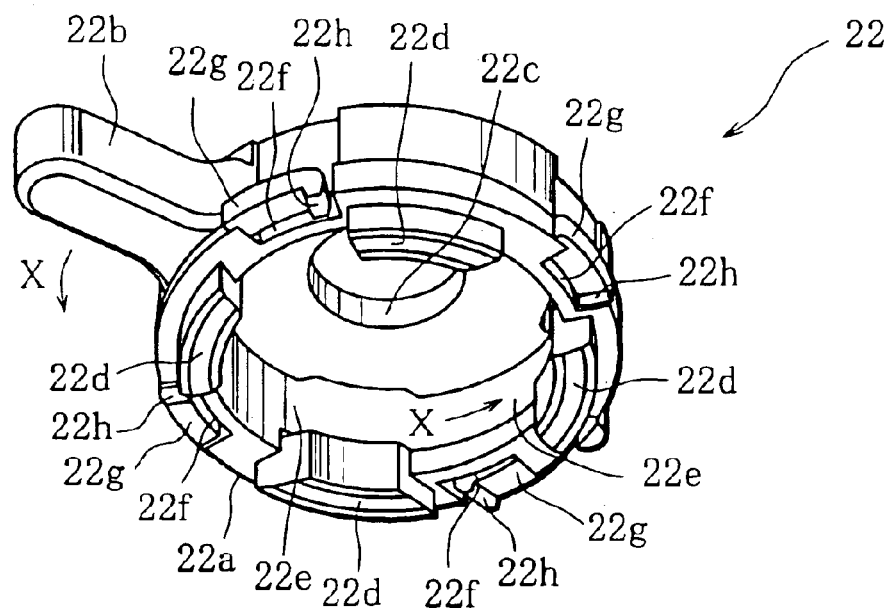
FIG. 3 is a perspective view of an engaging element shown in FIG. 2 that is diagonally seen from below.

The engaging element 22, as shown in FIG. 3, has a main body 22a in the shape of a cylinder with blind top. An operation knob 22b for rotating the engaging element extends outward from a prescribed position on an outer circumferential surface of the main body 22a. An insert bore 22c through which an operation shaft 33 of the ball valve 30 is to be inserted is formed at the center of a bottom portion (center in upper part in the figure). Additionally, engaging convex portions 22d are selectively arranged at regular intervals at an end and on the inner circumferential surface of an opening portion of the engaging element 22.

Consequently, the engaging concave/convex portions are substantially and selectively formed at the end and on the inner circumferential surface of the opening portion of the engaging element 22.

Figure 5:
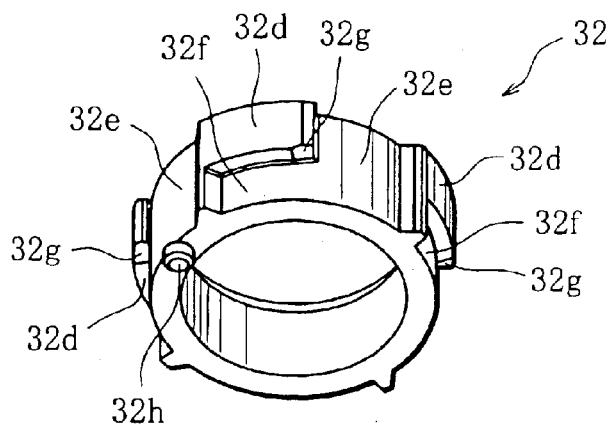
FIG. 5 is a perspective view of a locking element fixed to the valve shown in FIG. 1, the locking element being diagonally seen from below as a single object.

An interval between two adjacent engaging convex portions 22d is formed slightly wider than a circumferential width of a locking convex portion 32d of an after-mentioned locking element 32 (FIG. 5). The engaging convex portions 22d serve to maintain an engaging state of the actuator 20 and the ball valve 30 in consort with the locking convex portions 32d of the locking element as explained below in detail. Each inner circumferential wall portion 22e between two adjacent engaging convex portions 22d serves to bring the actuator 20 and the ball valve 30 into a disengaging state in consort with the locking convex portions 32d of the locking element 32.

In the outer circumferential portion at the end of the opening portion of the engaging element 22, notches 22f are formed at positions between the respective adjacent engaging convex portions 22d at regular intervals in a circumferential direction. A pushing arm 22g serving as pressing means extends from a circumferential one side end portion of each notch 22f toward the other side end portion thereof in the circumferential direction. A projection 22h is formed on a free end of each pushing arm 22g so as to project from the end of the opening portion in an axial direction. Each projection 22h of the pushing arm 22g slides along a taper portion 21e and stepped portion 21f of an after-mentioned yoke 21 (FIG. 4), and serves to move the engaging element 22 itself in the axial direction.

Figure 4:
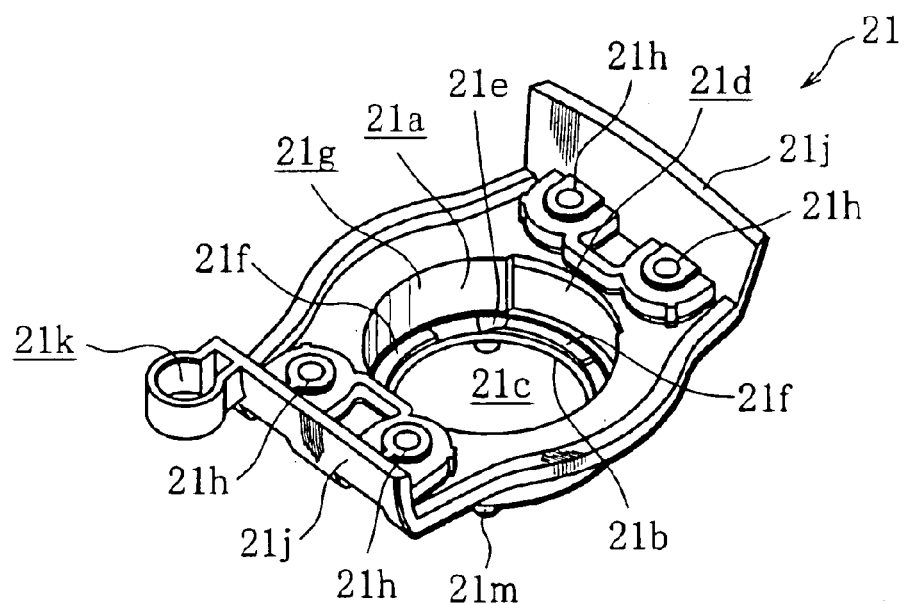
FIG. 4 is a perspective view of a yoke shown in FIG. 2 that is diagonally seen from above.

As shown in FIG. 4, the yoke 21 has a bore portion 21a with a large diameter for housing the engaging element. An internal diameter of the bore portion 21a is formed slightly larger than an external diameter of the engaging element 22, and depth of the bore portion 21a is formed slightly greater than axial length of the engaging element 22. A flange portion 21b that rotatably supports the engaging element 22 in the yoke is formed at a lower end of the bore portion 21a so as to be pendent inward through a whole circumference. A bottom opening portion 21c formed by the flange portion 21b has an internal diameter slightly larger than an external diameter of an after-mentioned locking element 32.

On a sidewall of the bore portion 21a, there is formed a window portion 21d through which the operation knob 22b of the engaging element 22 projects from the yoke 21. The window portion 21d has a prescribed width in the circumferential direction of the bore portion. By operating the operation knob 22b within this range, it possible to rotate the engaging element 22 received in the bore portion 21a up to a prescribed angle (for example, 40°) in the yoke. In other words, the yoke 21 serves as a holding portion that holds the engaging element 22 rotatably at the prescribed or smaller angle.

On an upper surface of the flange portion 21b, inclined portions (taper portions) 21e and the stepped portions 21f connected to the respective inclined portions are selectively disposed at regular intervals in the circumferential direction. The inclined portions 21e and the stepped portions 21f cooperate with the projections 22h of the pushing arms 22g to displace the engaging element 22 toward the upper opening portion 21g of the yoke 21 in the axial direction according to rotation of the engaging element 22. Each stepped portion 21f has such height that, when the engaging element 22 is rotated, with the actuator 20 tentatively attached to the ball valve 30, the projections 22h of the respective pushing arms 22g get upon the stepped portions, and upper end faces of the respective engaging convex portions 22d of the engaging element 22 (refer to FIG. 3) and lower end faces of the respective locking convex portions 32d of the locking element 32 (refer to FIG. 5) are brought in strong contact with one another in the axial direction.

At both ends of an upper end face of the yoke, mounting portions 21h for fixing the case 23a and the yoke 21 are formed as illustrated in FIG. 4 to fasten the yoke 21 to the case 23a through bolts, not shown. Moreover, sidewall portions 21j are formed in an upstanding state in the vicinity of the mounting portions located on the upper end face of the yoke. In addition, a receiving concave portion 21k for receiving an after-mentioned clutch mechanism is formed on a side of one of the sidewall portions 21j.

In a bottom portion of the yoke 21, four positioning projections 21m are projectingly formed at regular intervals in the circumferential direction and interfitted with respective positioning bores 34b formed on the upper surface of the flange of the ball valve 30 to tentatively attach the actuator 20 to the ball valve 30 (refer to FIG. 1). A function of the projections 21m is to prevent the actuator 20 and the ball valve 30 from rotating around the shaft due to counteraction that is caused when torque is transmitted from the output shaft of the actuator to the operation shaft 33 of the ball valve.

Although not shown, the housing 23 accommodates a deceleration mechanism comprising a motor that operates in receipt of supply of power from the outside and a gear train for transmitting a driving force of the motor, and accommodates a switch and electric components for controlling rotation of the motor, and the like. Thus, a large torque is transmitted to the output shaft, not shown, while the rotation of the motor is decelerated.

As illustrated in FIG. 2, an operation shaft 51 and a coil spring 52 are housed in the receiving concave portion 21k of the yoke 21. One end of the operation shaft 51 projects downward in the figure from a bore formed in a bottom portion of the receiving concave portion 21k due to an energizing force of the coil spring 52 (refer to FIG. 1). When this end is pushed in with a finger, the other end of the operation shaft 51 serves as a clutch that axially moves a certain reduction gear, not shown, located in the housing, to thereby release power transmission from the motor to the output shaft. That is, the output shaft is released from the holding torque so as to be rotatable in order to facilitate a manual operation of opening/closing the valve in view of the fact that the reduction gear train causes a large holding torque upon the output shaft even if the motor has a small holding torque.

In the joint 24, there is formed a jointing bore 24a (only one side is shown in FIG. 2) interfitted with a double chamfer portion at an end portion of the output shaft of the actuator 20 and a double chamfer portion at an end portion of the operation shaft of the ball valve 30, and two manual operation handles 24b extend outward from the outer circumference of the joint, which handles also serve to indicate the valve opening.

The manual operation handles 24b are formed so that an operator may grasp and turn the handles to manually adjust the valve opening without difficulty when the above-mentioned operation shaft 51 is pushed in to release the engagement of the reduction gear train.

As shown in FIG. 1, the ball valve 30 on which the actuator 20 is mounted comprises a valve main body 31 having a fluid inlet 31a and a fluid outlet 31b and accommodating therein a ball-like valve element, not shown, for adjusting a flow of a fluid; the operation shaft 33 for rotating the valve element; a cylindrical supporting stay 34 accommodating the operation shaft 33 except for an end portion of the shaft 33 and having an end portion thereof provided with a flange 34a for mounting the actuator; and the locking element 32 fixed to the flange 34a located around the operation shaft 33.

Positioning bores 34b to be engaged with the positioning projections 21m located in the bottom portion of the yoke are formed at four corners of the upper surface of the flange.

The locking element 32 is formed for easily attaching/detaching the actuator 20 to/from the ball valve 30. As illustrated in FIG. 5, the locking element 32 is formed into a substantially cylindrical shape and has its outer circumferential surface having one side (upper side in the figure) thereof on which the locking convex portions 32d to be engaged with the respective engaging convex portions 22d of the engaging element 22 of the actuator 20 are selectively arranged at regular intervals in the circumferential direction. Therefore, locking concave/convex portions are substantially and selectively formed in the locking element 32 in the circumferential direction.

In an outer circumferential portion of the locking element, release regions 32e are formed between adjacent locking convex portions 32d, which regions maintain the disengaging state in consort with the engaging convex portions 22d of the engaging element 22, and lock regions 32f are provided adjacent to the locking convex portions 32d in the axial direction, which regions maintain the engaging state in consort with the engaging convex portions 22d of the engaging element 22.

An external diameter, which is formed by the release regions 32e of the locking element 32 and lock regions 32f thereof located on the same circumferential surface as the release regions 32e, is slightly larger than an internal diameter formed by the engaging convex portions 22d of the engaging element 22. When the engaging element 22 is in a disengaging position, therefore, the engaging element 22 can be moved in the axial direction of the locking element 32 without resistance.

As mentioned above, the circumferential length of each locking convex portion 32d is slightly shorter than a circumferential interval between two adjacent engaging convex portions 22d of the engaging element 22. A lower surface of each locking convex portion 32d is located at such axial height that the upper end faces of the respective engaging convex portions 22d of the engaging element 22 (refer to FIG. 3) and the lower end faces of the respective locking convex portions 32d of the locking element 32 (refer to FIG. 5) are brought in strong contact with one another, when the actuator 20 is mounted on the ball valve 30 by interfitting the positioning projections 21m disposed in the bottom portion of the yoke with the respective positioning bores 34b arranged in the upper surface of the flange, and the projections 22h of the pushing arm 22g are caused to get on the stepped portions 21f of the yoke 21 by rotating the engaging element 22 to the engaging position.

Each taper portion 32g formed on circumferential one side face of each locking convex portion 32d of the locking element 32 serves to prevent the engaging convex portions 22d of the engaging element 22 from interfering with the lock regions 32f of the locking element 32 when the engaging element 22 is rotated, with the actuator 20 tentatively attached to a ball valve 10.

A plurality of projections 32h (FIG. 5 only shows one of them as an example) formed on one side end of the locking element 32 (lower end in FIG. 5) serve as positioning-fixing projections for fixing the locking element 32 to the ball valve 30. The projections 32h are engaged with the respective positioning bores 34b of the flange 34a of the ball valve 30. The locking element 32 is fixed to the flange 34a by means of setscrews (given no reference numeral).

The above-mentioned engaging element 32, the locking element 22 and the yoke 21 compose attaching/detaching means.

Hereinafter, procedures for mounting the actuator 20 with the above structure on the ball valve 30 will be explained.

First, as shown in FIG. 1, the actuator 20 and the ball valve 30 are disposed opposite each other, and the engaging element 22 of the actuator 20 is rotated to one side, or to the disengagement side (forward in the figure). In this state, the actuator 20 is brought closer to the ball valve 30 to insert the positioning projections 21m of the yoke 21 into the respective positioning bores 34b of the flange 34a. At this moment, the engaging element 22 of the actuator 20 is located on the disengagement side, so that the engaging convex portions 22d of the engaging element 22 moves in the axial direction while passing the portions between the respective adjacent locking convex portions 32d of the locking element 32, or the release regions 32e. At the same time, the locking convex portions 32d of the locking element 32 pass the portions between the respective adjacent engaging convex portions 22d of the engaging element 22. In other words, the engaging convex portions 22d and the locking convex portions 32d are relatively displaced while passing each other in the axial direction.

Figure 6A:
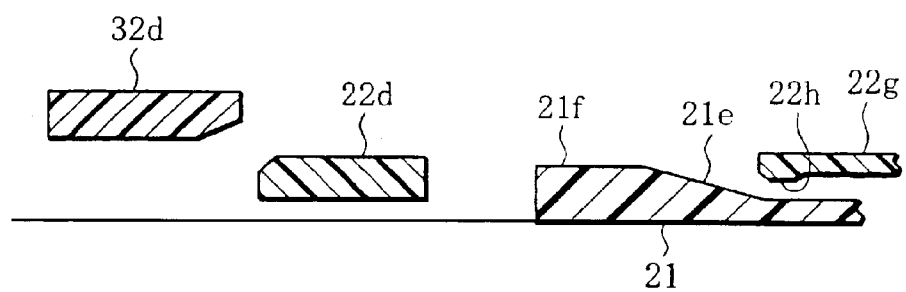
FIGS. 6A, 6B and 6C are views for explaining an engaging and a disengaging state of the actuator and the valve.

When the positioning projections 21m of the yoke 21 are tightly interfitted with the respective positioning bores 34b of the flange 34a (when the actuator 20 and the ball valve 30 are fixed in a horizontal direction), the engaging convex portions 22d of the engaging element 22 are located on the valve side in the axial direction with respect to the locking convex portions 32d of the locking element 32 (refer to FIG. 6A).

Figure 6B:
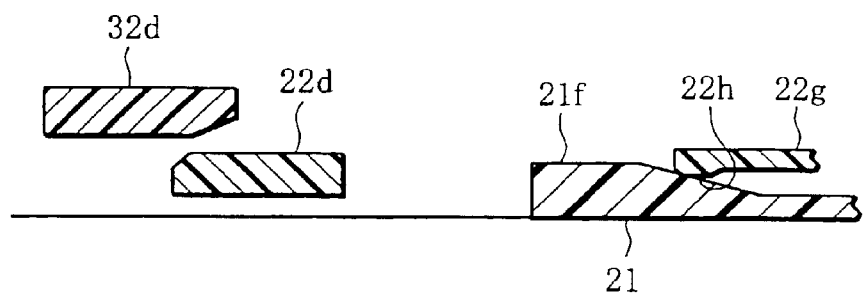

Once the engaging element 22 of the actuator 20 is rotated toward the engaging position (in a direction of arrow X in FIG. 1), the engaging convex portions 22d of the engaging element 22 begin getting into the respective lock regions 32f of the locking element 32. At this moment, since the locking element 32 is provided with the taper portions 32g, the engaging convex portions 22d of the engaging element 22 do not interfere with the locking convex portions 32d of the locking element 32 in the circumferential direction (refer to FIG. 6B).

Figure 6C:
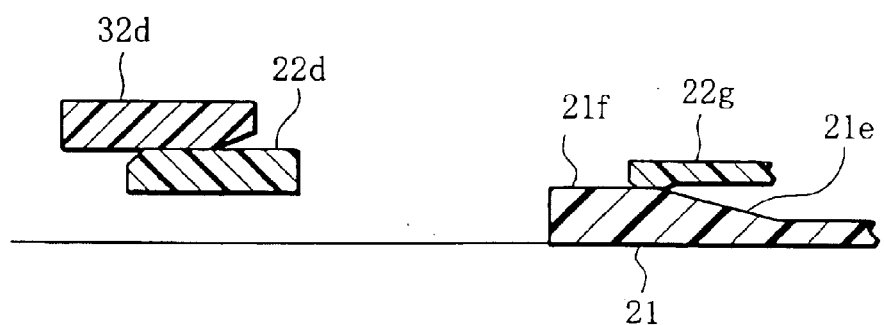
Figure 7:
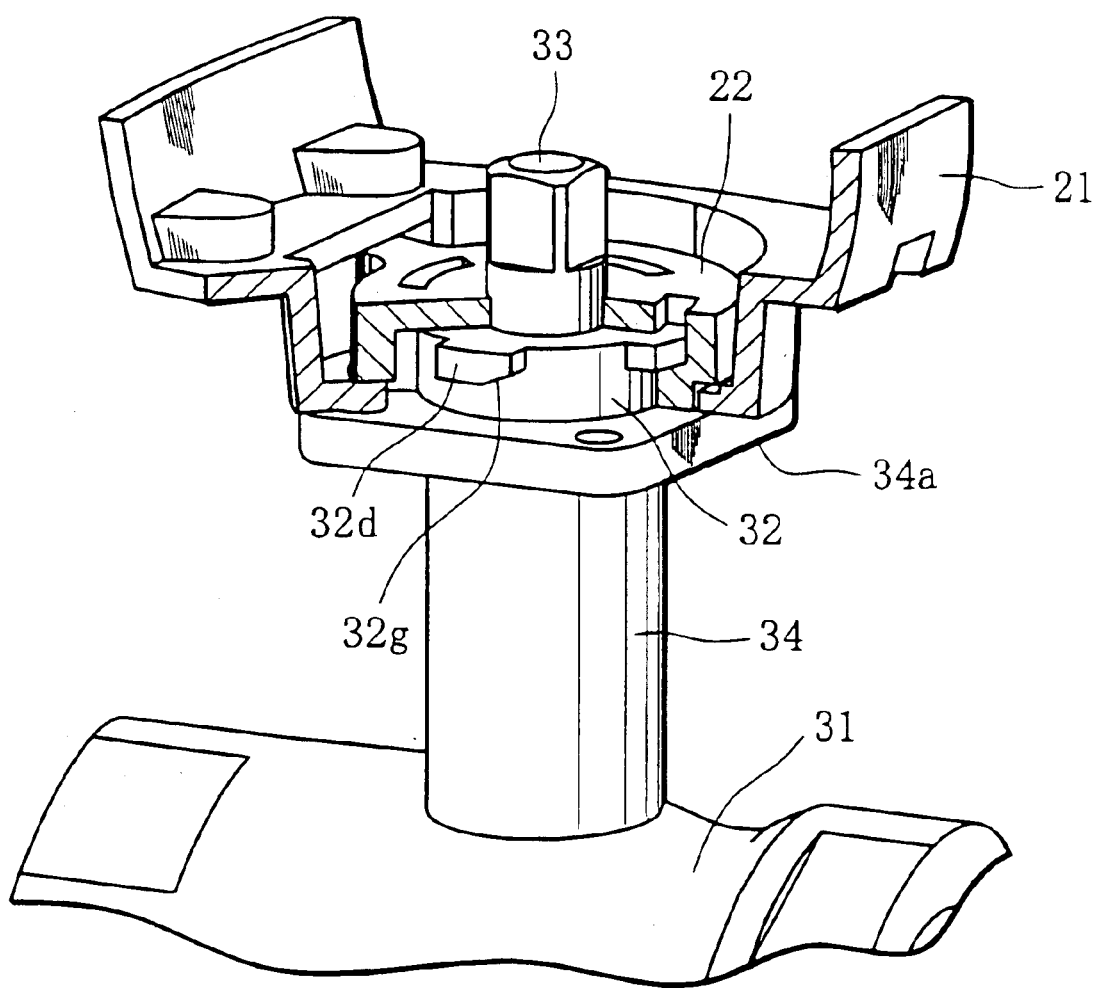
FIG. 7 is a perspective view of the actuator and the valve, partially broken away to show the engaging state of the valve and the actuator in part.
Figure 8:
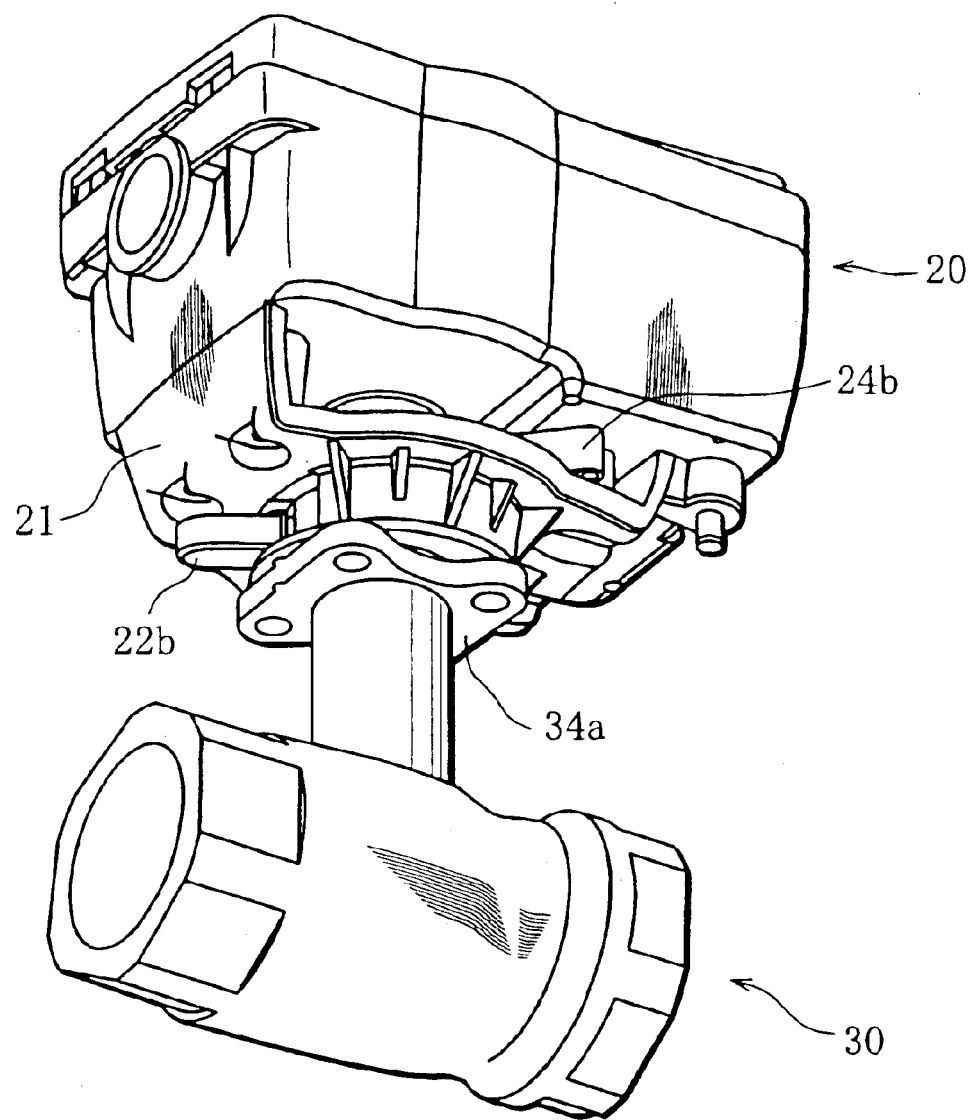
FIG. 8 is a perspective view showing the actuator in a state where it is mounted on the valve.

When the engaging element 22 of the actuator 20 is rotated to a position shown in FIGS. 7 and 8, the engaging convex portions 22d of the engaging element 22 wholly enter the respective lock regions 32f of the locking element 32. While the engaging convex portions 22d get into the lock regions 32f, the projections 22h formed in the end portion of the pushing arm of the engaging element 22 slide along the respective taper portions 21e of the yoke 21 and then get on the respective stepped portions 21f located on a bottom surface of the yoke. This movement of the pushing arm 22g draws the engaging element 22 to the actuator side by height of the stepped portion 21f. As a result, the engaging convex portions 22d of the engaging element 22 are in secure contact with the respective locking convex portions 32d of the locking element 32 and generate axial stress on the contact surfaces. This stress creates a frictional force on the contact surfaces of the engaging convex portions 22d and the locking convex portions 32d, thereby fixing the engaging element 22 (refer to FIGS. 6C and 7). Since such engaging operation requires a large torque, the operation knob 22b is projectingly formed so that a large torque may be manually generated.

If the engaging element 22 of the actuator 20 is rotated to the engaging position (position shown in FIGS. 7 and 8) in the above-described manner, the engaging convex portions 22d of the engaging element 22 wholly enter the respective lock regions 32f of the locking element 32 and are brought in strong contact with the respective locking convex portions 32d of the locking element 32. Accordingly, as partially illustrated in FIG. 7, the actuator 20 and the ball valve 30 are completely engaged with each other. Thus, even if the actuator 20 is mistakenly subjected to an external force, the actuator 20 is prevented from coming off the ball valve 30.

After the actuator 20 is mounted on the ball valve 30 by simple operation in the above-mentioned way, the actuator 20 is operated to open/close the ball valve 30 or adjust the opening of the ball valve 30.

When the actuator 20 is to be removed from the ball valve 30, the operation knob 22b of the engaging element 22 is rotated to the disengaging position (position shown in FIG. 1). Thus, the engaging convex portions 22d of the engaging element 22 move from the lock regions 32f to the release regions 32e side of the locking element 32 in the circumferential direction. Simultaneously, the projections 22h located in the end portion of the pushing arm of the engaging element 22 pass the stepped portions 21f and taper portions 21e of the yoke 21, which is accompanied by a slight detachment of the engaging element 22 from the locking element 32 in the axial direction. Consequently, each engaging convex portion 22d and each locking convex portion 32d reach a position (disengaging position) where they pass each other in the circumferential direction, and the contact and engagement between the engaging convex portions 22d of the engaging element 22 and the locking convex portions 32d of the locking element 32 are released.

If the actuator 20 is separated from the ball valve 30 in the above state, the engaging convex portions 22d of the engaging element 22 pass the portions between the respective adjacent locking convex portions 32d of the locking element 32, namely the release regions 32e, to detach the engaging element 22 from the locking element 32. At the same time, the connection of the output shaft, not shown, of the actuator 20 and the operation shaft 33 of the ball valve 30 is also released, so that the actuator 20 can be completely removed from the ball valve 30. In this embodiment, a rotation angle between the disengaging position and engaging position of the engaging element 22 is designed to be 40°.

As described above, the rotary valve actuator 20 and the valve gear 1 comprising the same according to the present invention enable the easy attachment/detachment of the actuator 20 and the ball valve 30, thereby reducing limitations in respect of an installation location. Furthermore, once the engaging element 22 is put into the engaging state, and the actuator 20 is engaged with the ball valve 30, the actuator 20 does not mistakenly come off the ball valve 30 even if an undesired external force is applied to the actuator 20.

Additionally, snap convex portions for latch engagement may be formed in prescribed positions on an inner wall of the bore of the yoke 21 and on the outer circumferential surface of the engaging element 22 to make the operation knob 22b of the engaging element 22 fastened at the disengaging and locking positions, respectively, through the latch engagement.

As long as the aforementioned snap convex portions capable of maintaining the engaging element 22 at the engaging position are provided, only the taper portions may be formed in the flange portion 21b of the yoke 21, and the stepped portions may be omitted.

In the present embodiment, although the engaging convex portions 22d of the engaging element 22 and the locking convex portions 32d of the locking element 32 are formed in four locations, respectively, the engaging convex portion 22d and the locking convex portion 32d may be arranged in at least one location, respectively.

The provision of the pushing arm 22g of the engaging element 22 and the taper portions 21e and stepped portions 21f of the yoke 21 is not inevitably necessary, so long as the resultant structure is designed such that the engaging convex portions 22d of the engaging element 22 are engaged with the respective locking convex portions 32d of the locking element 32 at the engaging position, and the engagement between the engaging convex portions 22d and the locking convex portions 32d is released at the disengaging position.

However, the provision of the above-mentioned elements makes it possible to more securely engaging the engaging element 22 with the locking element 32 at the engaging position. Furthermore, a strict accuracy is not required in the fabrication of the engaging element 22 and locking element 32.

If materials for the yoke 21, the engaging element 22 and the locking element 32 are not required to have a thermal insulating property, metal such as galvanized steel, aluminum, etc. may be used in place of resin, such as PPS (polyphenylene sulfides), PC (polycarbonate), etc.

Although the case in which the valve actuator 20 is mounted on the ball valve 30 has been explained in the embodiment, the intended use or type of a valve to which the actuator is mounted is not limited. The actuator may be mounted on a rotary valve such as a butterfly valve or a damper gear.

Hereinafter, a valve gear according to a second embodiment of the present invention will be described.

Structure elements identical to those of the above-described embodiment are denoted by corresponding reference numerals, and detailed explanations thereof will be omitted.

Figure 9:
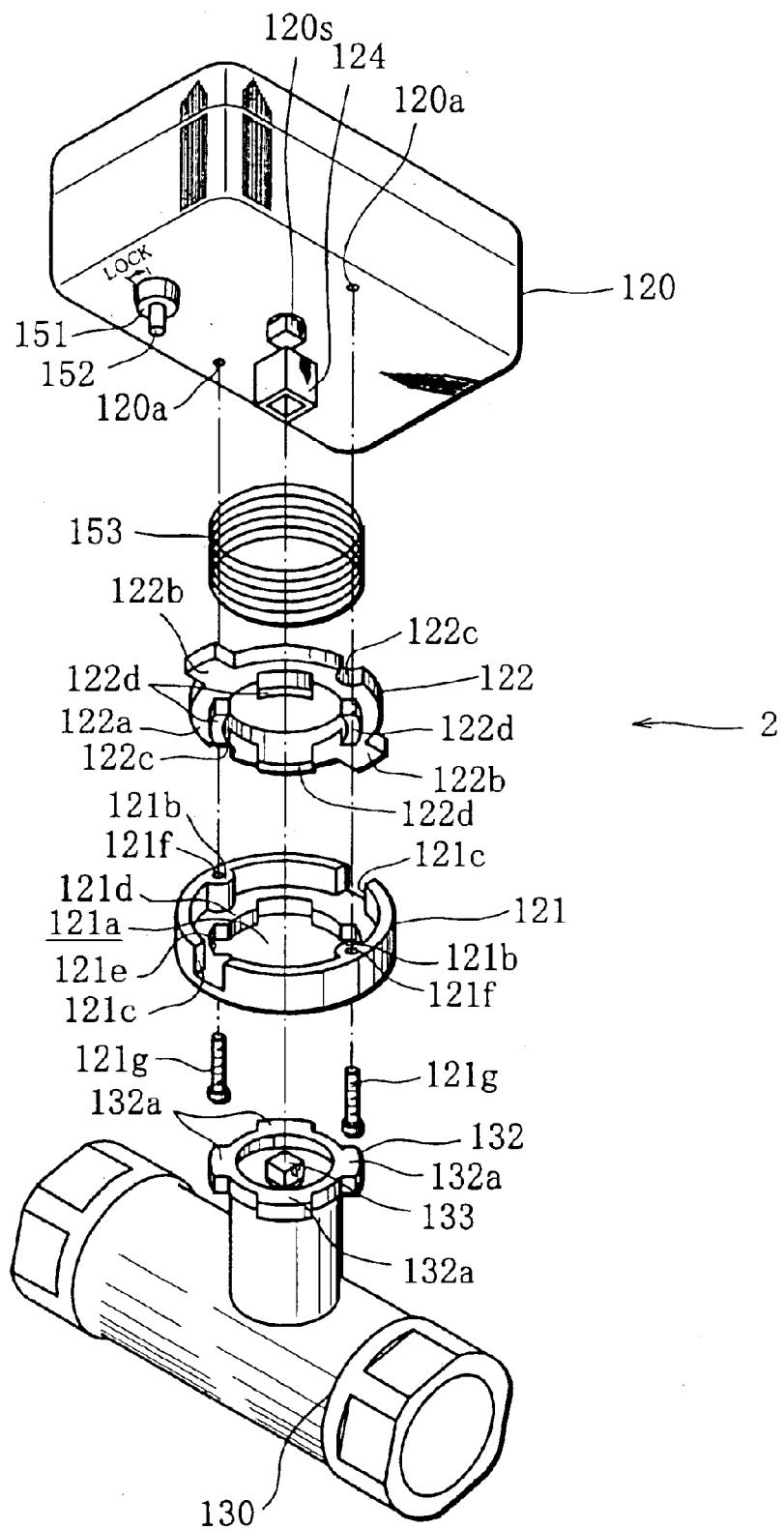
FIG. 9 is a perspective view of a valve gear according to a second embodiment of the present invention, with an actuator diagonally seen from below and a valve diagonally seen from above.

As illustrated in FIG. 9, a valve gear 2 including an actuator according to the second embodiment of the present invention comprises an actuator 120 having a resin-made yoke (holding portion) 121 and a resin-made engaging element 122 on an output shaft side, and a ball valve 130 having a resin-made locking element 132 fixed on an operation shaft side and adapted to be engaged with the engaging element 122.

An output shaft 120s for activating a rotary valve protrudes from a substantially central portion of a lower surface of the actuator 120 and is adapted to be coupled through a joint 124 onto an operation shaft 133 projecting from an end portion of the valve 130. A release clutch operation shaft 152 protrudes from the lower surface of the actuator 120 with a lock knob 151 intervening therebetween, and the output shaft of the actuator 120 can be freely rotated during the operation shaft is pressed. The lock knob 151 serves to lock/release the release clutch operation shaft 152.

On the lower surface of the actuator 120, screw holes 120a for mounting the yoke are formed at positions between which the operation shaft 120s is placed.

Unlike the first embodiment, the engaging element 122 is designed to be accommodated in the yoke 121 while being pressed against a bottom portion of the yoke by a compression coil spring 153. The engaging element 122 has a ring-shaped main body 122a, release knobs 122b projecting from an outer circumference of the main body in a diametral direction, semicircular rotation-blocking portions 122c formed in positions separated from the respective release knobs 122b at an angle of about 90° in a circumferential direction, and engaging convex portions 122d selectively arranged at regular intervals along an inner periphery on one side (lower side in the figure) of the engaging element 122. Accordingly, there are substantially and selectively formed engaging concave/convex portions on the inner periphery of the engaging element 122.

The yoke 121 is formed in the shape of a cup and has a bottom portion provided with a bore 121a formed in a prescribed shape. The yoke 121 includes an inner circumferential wall on which convex portions 121b having a semicircular shape in section are formed opposite each other, and notches 121c are located at portions separated from the respective convex portions 121b at 90° in a circumferential direction.

The bore 121a has two projecting portions 121d and two recessed portions 121e that are arranged alternately at regular intervals along the circumferential direction. The recessed portions 121e are formed in such shape and size that, when the engaging element 122 is accommodated in the yoke 121, only the convex portions 122d of the engaging element 122 are interfitted, and the circumferential surfaces of the respective convex portions 122d are brought in contact with a bottom surface of the yoke 121.

The notches 121c of the yoke 121 are engaged with the respective release knobs 122b of the engaging element 122, whereas the convex portions 121b of the yoke 121 are engaged with the respective notches 122c of the engaging element 122. Thus, the engaging element 122 does not rotate in the yoke and moves only in the axial direction of the output shaft of the actuator 120.

Furthermore, a mounting bore 121f is pierced and formed in each convex portion 121b of the yoke 121 so that the yoke 121 may be securely mounted on the actuator 120 by means of screws 121g.

On the other hand, fixed on the operation shaft end portion 133 of the valve 130 is the locking element 132. The locking element 132 is formed in the shape of a ring and has four convex portions 132a formed around the circumference thereof at regular intervals. Accordingly, locking concave/convex portions are substantially and selectively formed around the circumference of the locking element 132.

The convex portions 132a of the locking element 132 are so arranged as to correspond to the respective recessed portions 121e of the bore 121a of the yoke 121. That is, an external diameter of each convex portion 132a of the locking element 132 is formed slightly smaller than an internal diameter of each recessed portion 121e of the bore 121a of the yoke 121, and circumferential length of each convex portion 132a is so designed to be slightly shorter than that of each recessed portion 121e of the bore 121a. Moreover, each convex portion 132a of the locking element 132 has an external diameter slightly smaller than an internal diameter of each projecting portion 121d of the yoke 121.

As a result, the locking element 132 passes through the bore 121a of the yoke 121 to get inside of the yoke, and if the valve 130 is rotated at a prescribed angle (for example, 45°) with the locking element 132 maintained in the yoke, the convex portions 132a of the locking element 132 are superimposed on the respective projecting portions 121d of the bore of the yoke 121.

The circumferential length of each convex portion 132a of the locking element 132 is so designed as to be slightly shorter than a circumferential interval between two adjacent convex portions 122d of the engaging element 122. Thus, when the locking element 132 is rotated in the yoke, the convex portions 132a of the locking element 132 get into respective gaps (substantially recessed portions) between the convex portions 122b of the engaging element 122.

The aforementioned engaging element 122, the locking element 132 and the yoke 121 form the attaching/detaching means.

Hereinafter, procedures for attaching the actuator 120 to the valve 130 will be explained with reference to FIGS. 10 through 12.

Figure 10B:
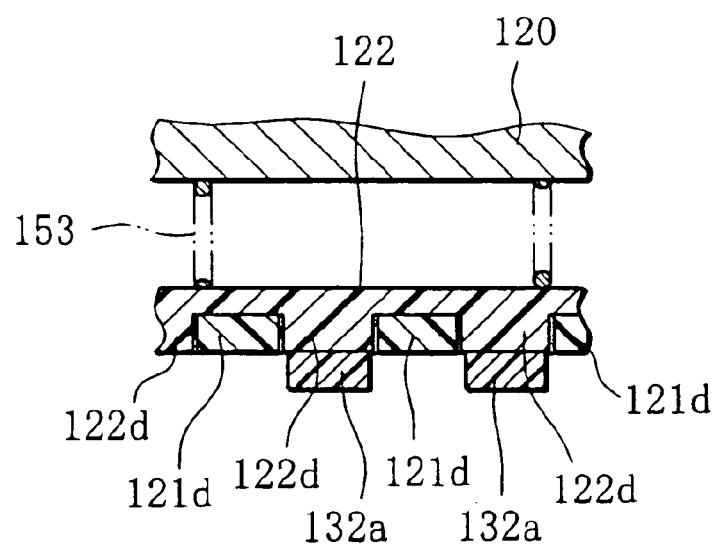
FIG. 10B is a sectional development view for schematically explaining FIG. 10A.
Figure 11A:
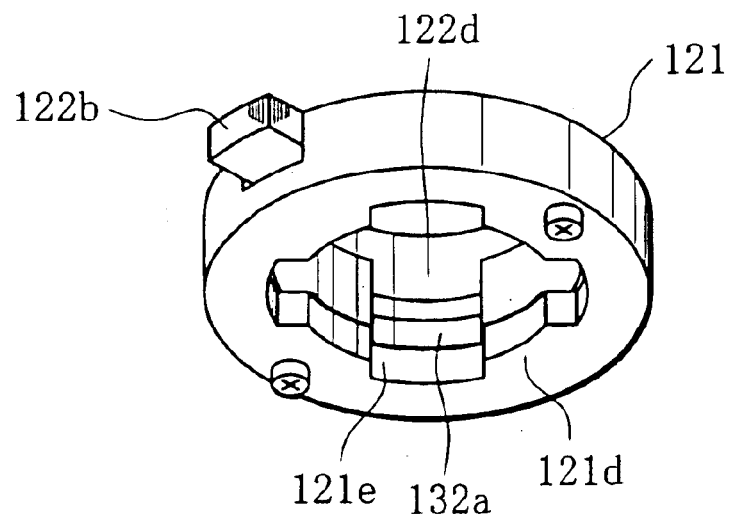
FIG. 11A is a perspective view partially showing the actuator and the valve according to the second embodiment of the present invention in the process of being attached to each other.
Figure 11B:
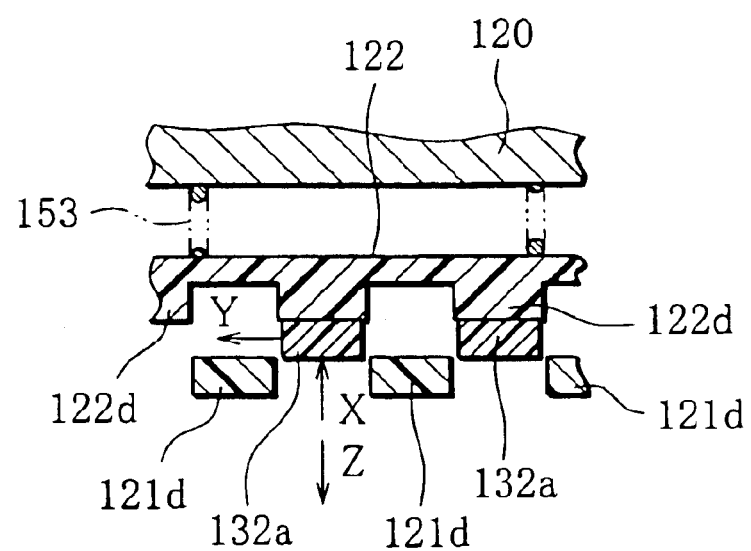
FIG. 11B is a sectional development view for schematically explaining FIG. 11A.
Figure 12A:
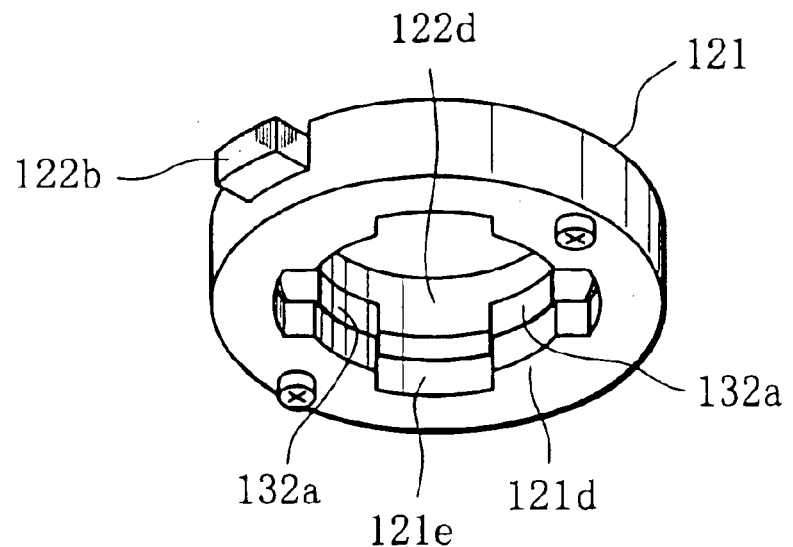
FIG. 12A is a perspective view partially showing the actuator and the valve according to the second embodiment of the present invention in a state where they are attached to each other.
Figure 12B:
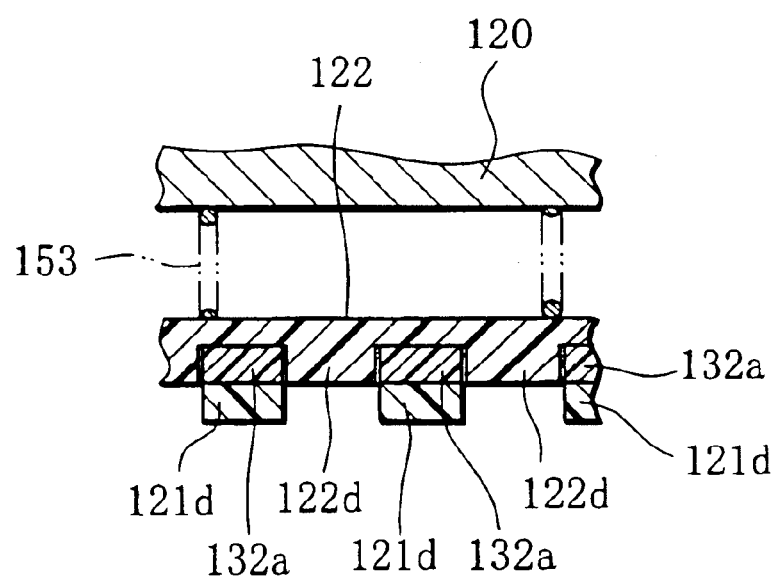
FIG. 12B is a sectional development view for schematically explaining FIG. 12A.

FIGS. 11A and 12A schematically illustrate the joint 124. FIGS. 10B, 11B and 12B partially show attached portions in circumferential development for convenience in order to plainly describe the attaching process.

Figure 10A:
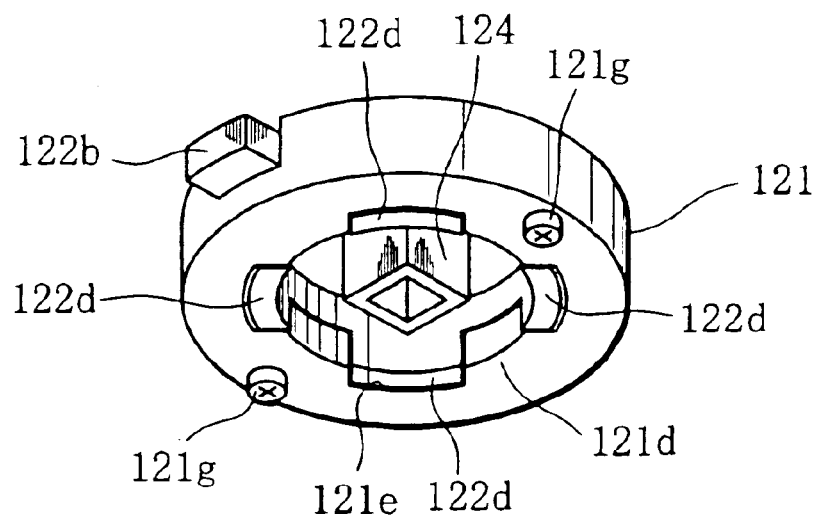
FIG. 10A is a perspective view partially showing the actuator according to the second embodiment of the present invention in a state before it is attached to the valve.

Before the attachment, as shown in FIGS. 10A and 10B, the engaging element 122 is pressed against the bottom portion of the yoke 121 by an energizing force of the coil spring 153, and the convex portions 122d of the engaging element 122 get into the respective recessed portions 121e of the bore 121a of the yoke 121 (refer to FIG. 10A).

In this state, the valve 130 is brought closer to the actuator 120 and positioned so that the convex portions 132a of the locking element 132 correspond to the respective convex portions 122d of the engaging element 122 (refer to FIG. 10B).

Next, in the above-described state, the valve 130 is pressed against the actuator side to cause the convex portions 132a of the locking element 132 to enter the inside of the yoke. Thus, while the convex portions 122d of the engaging element 122 and the convex portions 132a of the locking element 132 are in contact with one another, the engaging element 122 moves against the energizing force of the coil spring 153 in the axial direction (X-direction in FIG. 11B).

Thereafter, in this state, the valve 130 is rotated at a prescribed angle (for example, 45°) in one direction (Y-direction in FIG. 11B). Since the operation shaft 133 of the valve 130 can rotate with the rotation of the valve 130, the release clutch operation shaft 152 is brought into a released state so that the actuator 120 does not rotate with the valve 130.

As a result, the locking element 132 rotates relatively to the engaging element 122, and eventually the convex portions 132a of the locking element 132 enter the respective gaps (recessed portions) between the convex portions 122d of the engaging element 122. At the same time, the engaging element 122 moves away from the actuator 120 in the axial direction (Z-direction in FIG. 11B) due to the energizing force of the coil spring 153 and is brought into a state shown in FIGS. 12A and 12B.

In other words, the convex portions 132a and the gaps between the convex portions (substantially forming the recessed portions) of the locking element 132 are engaged with the gaps between the convex portions 122d (substantially forming the recessed portions) and the convex portions 122d of the engaging element 122, respectively.

Since the axial rotation of the engaging element 122 is controlled by the yoke 121 as described above, the rotation of the locking element 132 is also controlled, and consequently the valve 130 can be securely attached to the actuator 120.

As mentioned above, in the attached state, the engaging element 122, the locking element 132 and the yoke 121 are firmly engaged with one another. Thus, when the torque is transmitted from the output shaft 120s of the actuator 120 to the operation shaft 133 of the valve 130 through the joint 124, the actuator 120 and the valve 130 are prevented from rotating due to counteraction caused by the torque transmission.

When the attachment of the actuator 120 and the valve 130 is to be released, the operator presses the release knob 122b in a direction of the actuator and releases the engagement between the engaging element 122 and the locking element 132. In this state, the release clutch operation shaft 152 is brought into the released state, and the valve 130 is again rotated at the prescribed angle (about 45°) toward the position where it is before the attachment.

Consequently, the locking element 132 is brought into a state shown in FIGS. 11A and 11B, and the locking element 132 is taken out of the yoke 121 to separate the valve 130 from the actuator 120.

Although the aforementioned embodiment explains the structure in which the yoke serving as a holding portion of the locking element is provided on the actuator side, the present invention is not necessarily limited to this and may have a structure in which the yoke is provided on the valve side so that the locking element may be rotatable at a prescribed angle in the yoke, and the engaging element is fixed to the actuator.

Furthermore, in the above-described embodiment, an electric motor is exemplified as motive power of the actuator. However, the present invention is not limited to this, and the use of an air-operated motor or an air-cylinder that generate the motive power by compressed air supplied from the outside is in an applicable scope of the present invention.

In other words, the present invention is not limited by the embodiments apart from the matters described in the scope of claims.

What is claimed is:

1. A valve gear comprising:
    a valve for controlling a flow rate of a fluid, an opening of the valve being determined according to a rotational position of a valve element;
    an actuator for providing a rotational force to a rotary valve shaft that changes the valve opening; and
    attaching/detaching means for detachably attaching said valve to said actuator,
    wherein said attaching/detaching means comprises a locking element formed at prescribed positions with locking concave/convex portions, and an engaging element formed at prescribed positions with engaging concave/convex portions, and a holding portion for holding said engaging element rotatably around the rotary valve shaft up to a prescribed angle, said locking element and said engaging element are relatively rotatable around said rotary valve shaft up to the prescribed angle, and said engaging element and said locking element prevent said actuator from coming off said valve at an engaging position where said engaging concave/convex portions and said locking concave/convex portions are engaged with one another, and allow said actuator and said valve to be detached from each other at a disengaging position where engagement between said engaging concave/convex portions and said locking concave/convex portions is released.

2. Attaching/detaching means for detachably attaching a valve, which controls a flow rate of a fluid and an opening of which is determined according to a rotational position of a valve element, to an actuator for providing a rotational force to a rotary valve shaft that changes the valve opening, comprising:

a locking element formed at prescribed positions with locking concave/convex portions;

an engaging element formed at prescribed positions with engaging concave/convex portions; and a holding portion for holding said engaging element rotatably around the rotary valve shaft up to a prescribed angle, wherein said locking element and said engaging element are relatively rotatable around said rotary valve shaft up to the prescribed angle, and said engaging element and said locking element prevent said actuator from coming off said valve at an engaging position where said engaging concave/convex portions and said locking concave/convex portions are engaged with one another, and allow said actuator and said valve to be detached from each other at a disengaging position where engagement between said engaging concave/convex portions and said locking concave/convex portions is released.

3. An actuator that is attachable to and detachable from a valve, for providing a rotational force to a rotary valve shaft that changes an opening of the valve, which controls a flow rate of a fluid and an opening of which is determined according to a rotational position of a valve element, said actuator comprising:

an engaging element formed at prescribed positions with engaging concave/concave portions, wherein said engaging element is made rotatable around the rotary valve shaft up to a prescribed angle by a holding portion, wherein said engaging element is mounted on said valve and rotatable around said rotary valve shaft up to the prescribed angle relatively to a locking element formed at prescribed positions with locking concave/convex portions, and wherein said engaging element prevents said actuator from coming off said valve at an engaging position where said engaging concave/convex portions and said locking concave/convex portions of said locking element are engaged with one another, and allows said actuator to be detached from said valve at a disengaging position where engagement between said engaging concave/convex portions and said locking concave/convex portions is released.

4. A valve for controlling a flow rate of a fluid, wherein an opening of the valve is determined according to a rotational position of a valve element and the valve attachable to and detachable from an actuator for providing a rotational force to a rotary valve shaft that changes the valve opening, said valve comprising:

a locking element formed at prescribed positions with locking concave/convex portions, wherein said locking element is rotatable around said rotary valve shaft up to a prescribed angle relatively to an engaging element mounted on said actuator and formed at prescribed positions with engaging concave/convex portions, wherein said engaging element is made rotatable around the rotary valve shaft up to the prescribed angled by a holding portion, wherein said locking element prevents said valve from coming off said actuator at an engaging position where the locking concave/convex portions and the engaging concave/convex portions of said engaging element are engaged with one another, and allows said valve to be detached from said actuator at a disengaging position where engagement between said locking concave/convex portions and said engaging concave/convex portions is released.

5. The valve gear according to claim 1, wherein said holding portion is adapted to be fixed to said actuator, and said locking element is adapted to be fixed to said valve.

6. The attaching/detaching means according to claim 2, wherein said holding portion is adapted to be fixed to said actuator, and said locking element is adapted to be fixed to said valve.

7. The actuator according to claim 3, wherein said holding portion is fixed to said actuator, and said engaging element is adapted to be engaged with and disengaged from said locking element that is fixed to said valve.

8. The valve according to claim 4, wherein said holding portion is fixed to said actuator, and said locking element is fixed to said valve and adapted to be engaged with and disengaged from said engaging element.

* * * * *